W. I. TWOMBLY.
MECHANICAL MOVEMENT.
APPLICATION FILED APR. 7, 1910.

1,016,978.

Patented Feb. 13, 1912.
5 SHEETS—SHEET 1.

WITNESSES:
Percy A. Smith
Edward C. Thompson

INVENTOR
Willard Irving Twombly
BY
John A. Seifert
ATTORNEY

W. I. TWOMBLY.
MECHANICAL MOVEMENT.
APPLICATION FILED APR. 7, 1910.

1,016,978.

Patented Feb. 13, 1912.

WITNESSES:
Percy A. Smith
Howard E. Thompson

INVENTOR
Willard Irving Twombly
BY
John A. Seifert
ATTORNEY

W. I. TWOMBLY.
MECHANICAL MOVEMENT.
APPLICATION FILED APR. 7, 1910.

1,016,978.

Patented Feb. 13, 1912.

WITNESSES:

INVENTOR
Willard Irving Twombly
BY
ATTORNEY

W. I. TWOMBLY.
MECHANICAL MOVEMENT.
APPLICATION FILED APR. 7, 1910.

1,016,978.

Patented Feb. 13, 1912.
5 SHEETS—SHEET 5.

WITNESSES:
Percy A. Smith
Howard C. Thompson

INVENTOR
Willard Irving Twombly.
BY John O. Seifert
ATTORNEY

UNITED STATES PATENT OFFICE.

WILLARD IRVING TWOMBLY, OF NEW YORK, N. Y., ASSIGNOR, BY MESNE ASSIGNMENTS, TO TWOMBLY MOTORS COMPANY, OF NEW YORK, N. Y., A CORPORATION OF NEW YORK.

MECHANICAL MOVEMENT.

1,016,978.  Specification of Letters Patent.  Patented Feb. 13, 1912.

Application filed April 7, 1910. Serial No. 553,948.

*To all whom it may concern:*

Be it known that I, WILLARD IRVING TWOMBLY, a citizen of the United States, residing in the borough of Manhattan, in the city, county, and State of New York, have invented a new and useful Improvement in Mechanical Movements, of which the following is a specification.

This invention relates to mechanical movements applicable as variable speed power transmission mechanism for any purpose for which such mechanism is adapted, such, for instance, as a driving mechanism for motor vehicles, machine tools, etc., and it may also be adapted as a speed reducing mechanism for use in connection with electric motors, etc.

It is the object of the invention to provide a mechanical movement whereby to transmit from a primary or driving element continuously rotating in one direction variable forward and reverse rotary motions to a driven element irrespective of whether the axes of said driving and driven elements are in the same plane or at an angle to each other.

In carrying out the invention I provide a driving element comprising a shaft having a wheel with a series of circular threads adjustable to transform them into eccentric threads or multiple threaded right or left hand spirals, the convolutions of which spirals when adjusted are in the same plane but the eccentricity or throw varying, and a driving element comprising a shaft having a toothed wheel connected thereto, selective means being provided to throw the driving element into and out of operative relation with the driven element, and to adjust said threads to transmit variable forward or reverse rotary motions to the driven element, all of such mechanism being operatively mounted in a casing.

In the drawings accompanying and forming a part of this specification.

Similar characters of reference designate like parts throughout the different views of the drawings.

In the drawings I have illustrated one manner of applying my invention, and have shown the same as a variable speed power transmission mechanism for a motor vehicle, comprising a hollow drive shaft 1 which may be connected to any suitable source of power, such as an engine (not shown), said shaft being square in cross section for a portion of its length and journaled in one end of a section *a* of a casing by means of a standard ball bearing, consisting of a pair of rings 2, 3 with a series of balls 4 and ball carrier or separator between said rings, the said ball bearing contained between a flange 5 in the casing and a screw threaded cap 5'. On one end of said shaft I mount a head 6 having a sleeve, said head rotating with said shaft and having sliding movement thereon along its axis. Said sleeve constitutes one part of a roller bearing whereby the shaft 1 is journaled in the casing section $a$, rollers 7 running upon said sleeve and within a ring 8 and retained in place by a collar 9. A wheel comprising a pair of segments 10, 11 said segments having a dovetail connection 12, is connected to said head 6 by means of dovetail gibs or guide-ways 13 to have sliding movement laterally of and relatively to each other and transversely of the axis of the shaft. Each wheel segment has a series of concentric semi-circular threads $c$, and when adjusted relatively to each other form a series of concentric circles of threads, but when said segments are adjusted laterally of each other and transversely of the axis of the driving shaft, the center of said semi-circles of threads is changed transforming them into eccentric circles or multiple threaded right or left hand spiral threads or worms the planes of the convolutions of which are the same but the eccentricity or throw varying, said threads are adapted to mesh with a worm wheel 14 fixed to a driven shaft 15 (in the present instance the rear axle of a motor vehicle,) journaled in a section $b$ of the casing or housing.

To adjust the wheel segments laterally of each other, I provide each segment with rack teeth 16, 17 with which teeth meshes a pinion 18 fixed to a shaft 19 mounted in the hollow shaft 1 to rotate therewith and have independent forward and reverse rotary movements. Said pinion shaft 19 is provided with a helical groove 20 in which engages a key 21 fixed to a slot in the bushing 22 and held in place by a screw 23 passing through the bushing. The said bushing is mounted on the shaft 1 to rotate therewith and have sliding movement thereon, the key passing through a slot 24 in the shaft 1 to engage with the helical groove 20. An annular groove 25 is formed in the bushing 22 in which engages a two-piece collar 27 held in position by bolts 28, and provided with oppositely-extending pins 29 to which are pivotally secured arms 30 having a pivotal connection with arms 31 fixed upon a rock-shaft 32 journaled in the case section $a$, all of such mechanism being inclosed within the said casing section $a$. Fixed to the rock shaft 32 outside of the casing is an arm 33 to which is connected a rod 34 having a pivotal connection with a pivoted operating lever or actuator 35. A releasable latch 36 is connected to the lever 35 to engage with either one of a series of notches 37 in a fixed rack 38 to lock said lever in adjusted positions.

The means to throw the spiral threads or worms $c$ on the segmental drive wheel into and out of mesh with the driven-shaft worm 14 comprises a thrust bearing 39 of usual construction and shown as consisting of a pair of rings with a series of balls and ball carrier between the same, and a pair of lock-nuts 40, 40' fixed upon the sleeve of the drive shaft head 5, a collar 41 being interposed between the lock-nuts and thrust bearing and rotatable on the sleeve 6. The collar 41 has a pair of outwardly-extending pins or lugs 42 to each of which is pivotally connected an arm 43 fixed upon a rock-shaft 44 journaled in the case section $a$. The rock-shaft 44 has fixed thereto outside of the casing an arm 45 to the upper end of which is pivotally secured an auxiliary rocking arm or latch 46 having connected thereto a rod 47, and the latter pivotally connected with an actuator or operating lever 48, in the present instance shown as a foot pedal. The means for locking said drive wheel in operative relation with the driven-shaft worm comprises a pawl 49 forming a part of the pivoted rock-arm 46 and which is adapted to engage with a notch 50 in a guideway or quadrant 51 secured to the case section $a$.

Figure 16:
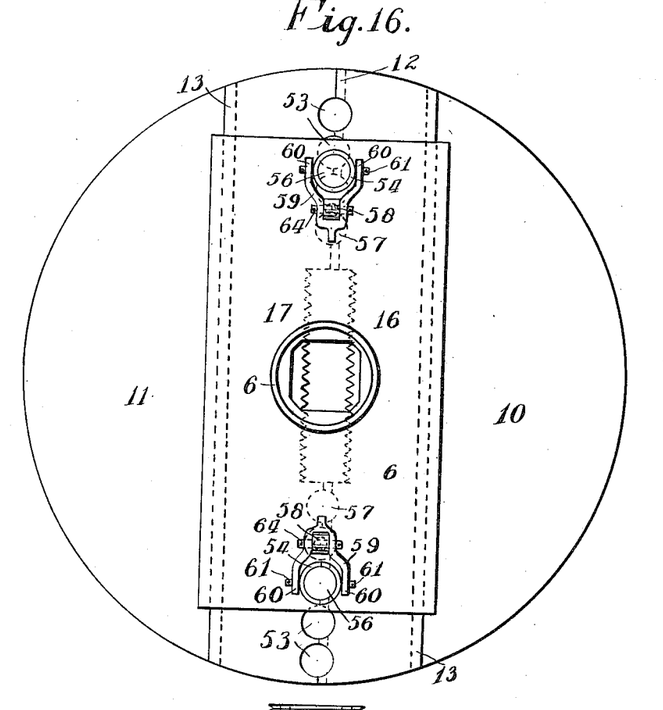
Fig. 16 is an enlarged view of the driving wheel looking in the rear thereof.
Figure 17:
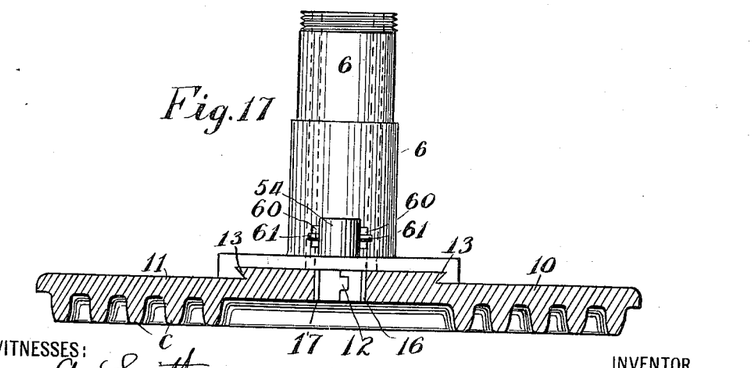
Fig. 17 is an enlarged sectional side elevation of the driving wheel illustrating the mounting thereof on the driving shaft head.

To lock the wheel segments in adjusted positions, and to also prevent twisting and distortion of the segments when in operation, I provide a series of locking keys or pins 52, in the present instance shown as two in number, engaging in sockets or recesses 53, one part of which recesses is formed in one of the wheel segments, as 10, and adapted to register with another recess portion in the other wheel segment 11. These keys are located at equal distances from the center of the driving shaft, and the sockets so located in the driving wheel sections so that at least one of the pins or keys will be in locking engagement with one of the sockets when the segments of the wheel are adjusted. (Fig. 16.) The keys are slidably mounted in a sleeve or thimble 54 having a screw threaded connection with the wheel-segment carrying-head 6 and are normally held in locked position by a compression spring 55 contained within the thimble by a screw-threaded cap 56. When the driving-wheel segment is thrown out of mesh with the driven-shaft worm, simultaneously therewith the locking keys 52 are thrown out of engagement with the sockets 53 in the wheel segments. For this purpose I provide a rocking lever 57 pivotally mounted upon a stud 58 secured in the wheel-carrying head 6. One portion of said lever is yoke shaped, as at 59, and each arm of the yoke is provided with a forked portion 60 to engage with one of a pair of oppositely-extending pins 61 fixed in the locking keys 52, and projecting through slots 62 in the key sleeves or housing, the other end of the lever 51 engaging with a ring 63 secured inside of the casing section a to rock it upon its pivot 64.

In the present instance I have shown the segmental-driving wheel as provided with five circles of threads, whereby I am enabled to transmit to the driven shaft four different forward and reverse motions or speeds, and also obtain a neutral position with no power transmitted. When the segments have been adjusted one tooth or thread space, the circles of threads have been transformed into a double-threaded spiral the planes of the convolutions of which are the same, and the driven shaft is driven at its lowest velocity, the ratio between the driving and the driven shaft in the present instance being sixteen to one, that is, sixteen revolutions of the driving shaft impart one revolution to the driven shaft. When the segments have been adjusted two tooth or thread spaces, the circles have been transformed into a quadruple-threaded spiral, the planes of the convolutions of which are the same but different from the planes when adjusted one tooth or thread space and the eccentricity or throw of the spiral has been increased, the ratio between the driving and driven shaft being eight to one. When adjusted three tooth or thread spaces the threads have been transformed into a six-threaded spiral, the planes of the convolutions of which are the same but different from the planes when adjusted one or two tooth spaces, and the eccentricity or throw of the spiral has been increased relative to the eccentricity of the spiral when adjusted one or two tooth spaces, the ratio between the drive and driven shaft being five and one-third to one. When adjusted to their outermost positions or four tooth or thread spaces, the threads are transformed into an eight-threaded spiral with the planes of the convolutions the same but different from convolutions when adjusted one, two or three the planes when adjusted one, two or three tooth spaces, and the eccentricity or throw of the spiral has again been increased. When the wheel segments are in the latter position the driven shaft is rotated at its highest velocity, the ratio between the driving and driven shaft being four to one. By adjusting the segments in an opposite lateral direction and transversely of the axis of the drive shaft the same reverse speeds will be obtained. However, in the present instance I have illustrated the mechanism capable of adjusting the wheel segments one tooth space only for a slow reverse speed, which in the case of power transmission mechanism for motor-vehicle drives is sufficient. It is essential that the threads or spirals on the drive-wheel come in perfect alinement when the wheel-segments are shifted. If for any reason a finer adjustment is desired, as when the mechanism is used as a feeding device in connection with machine tools, etc., it can be obtained by using a driving wheel having finer threads or spirals to fit a driven wheel having teeth of finer pitch.

Figures 1, 4, 5, 6:
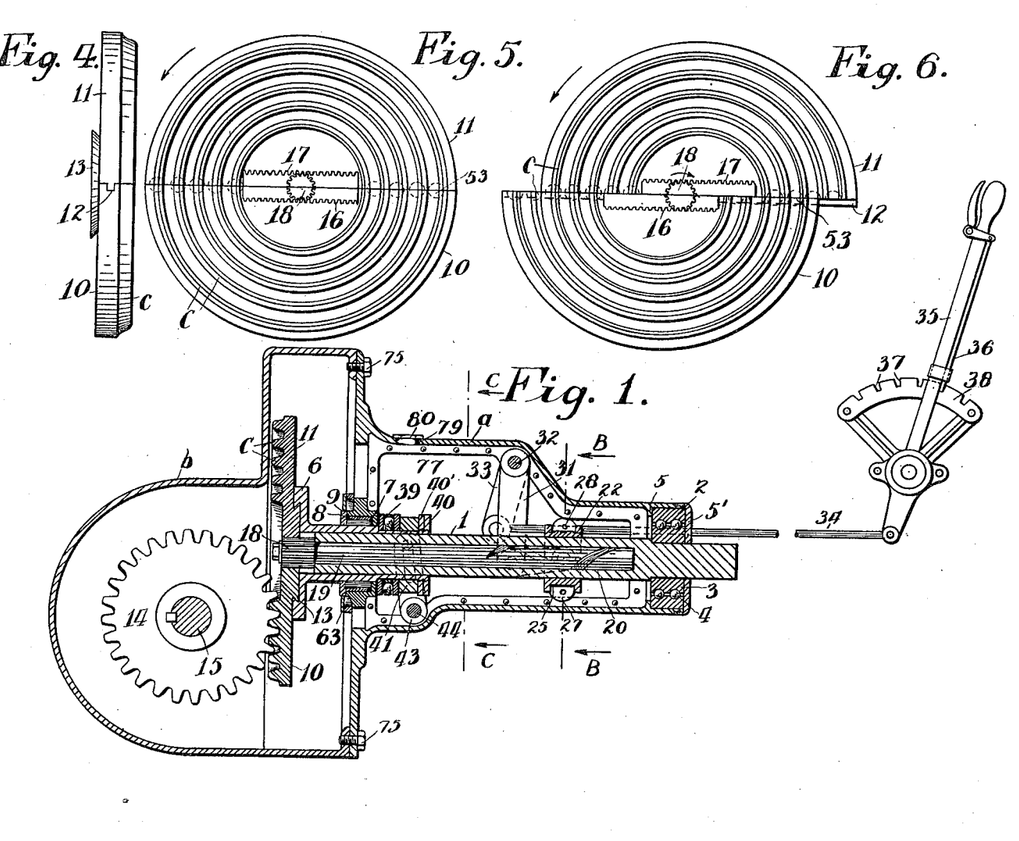
Figure 1 is a sectional side elevation illustrating my invention as inclosed in a casing and as constituting a variable speed power transmission mechanism for a motor vehicle, the parts being shown in operative positions.
Fig. 4 is a side elevation of the driving wheel.
Fig. 5 is a face view of the driving wheel showing the position the threads assume when the wheel is in neutral position, and no power transmitted.
Fig. 6 is a view similar to Fig. 5 but illustrating the wheel threads adjusted to transmit forward motion to the driven element.
Figures 2, 8, 9:
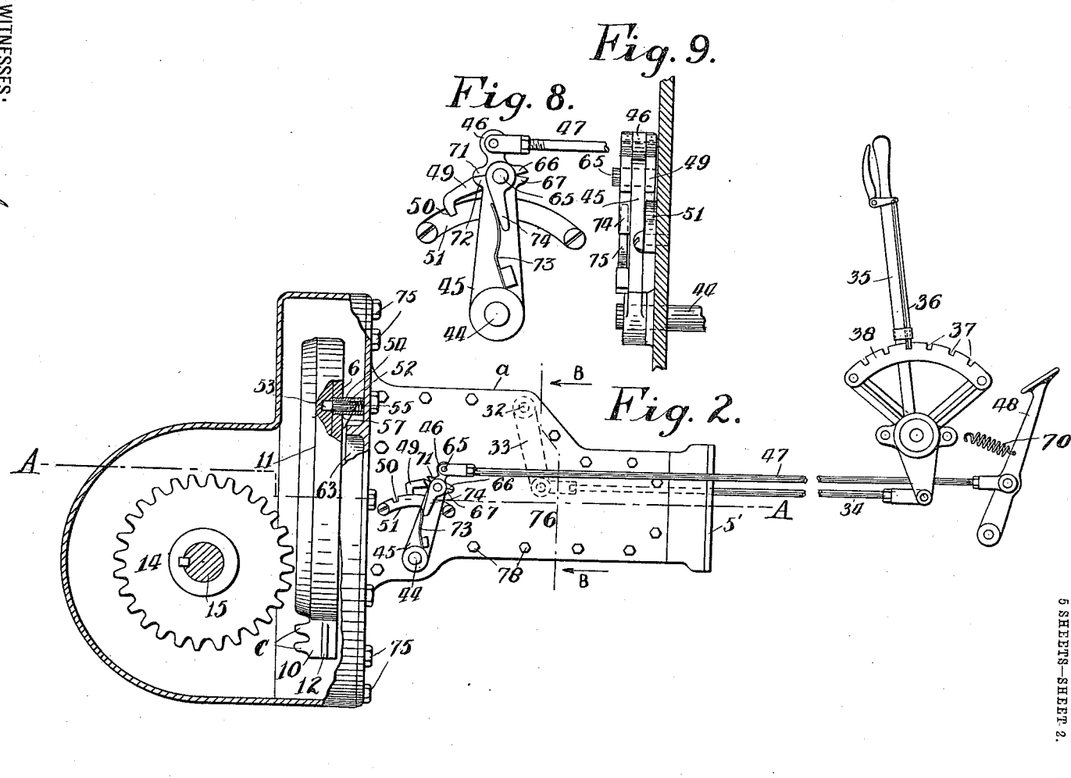
Fig. 2 is a side elevation, partly in section, showing the driving and driven elements in inoperative positions, and the means for throwing the parts in such positions.
Fig. 8 is a detail illustrating the means to lock the driving element in operative relation with the driven element.
Fig. 9 is a side elevation of the parts shown in Fig. 8.
Figures 3, 12, 13, 14, 15:
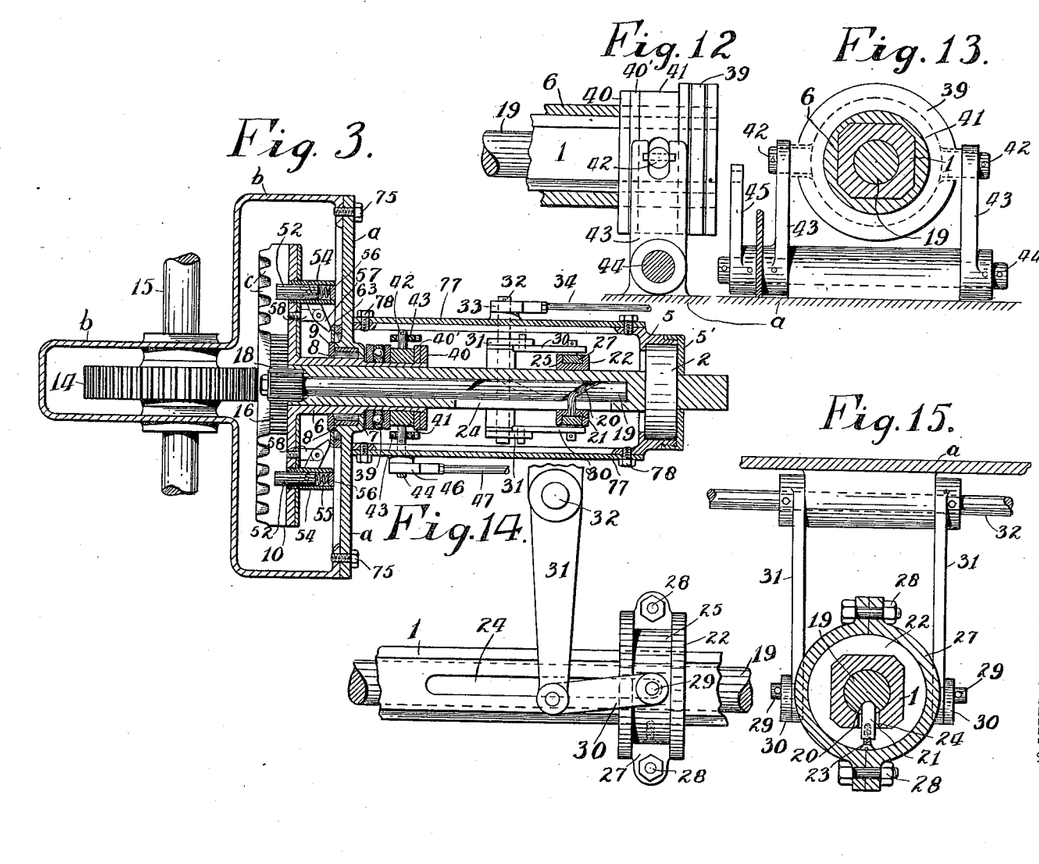
Fig. 3 is a sectional plan view taken substantially on the line A—A of Fig. 2.
Fig. 12 is an enlarged detail side elevation of the mechanism for throwing the driving-shaft wheel into and out of operative relation with the driven-shaft worm.
Fig. 13 is a view of the parts shown in Fig. 12 looking at the left hand thereof, and also taken on the line C—C of Fig. 1.
Fig. 14 is an enlarged detail side elevation of the mechanism for adjusting the drive-wheel segments.
Fig. 15 is a view of the parts shown in Fig. 14 looking at the right of said figure, and also taken on the lines B—B of Fig. 1.
Figure 7:
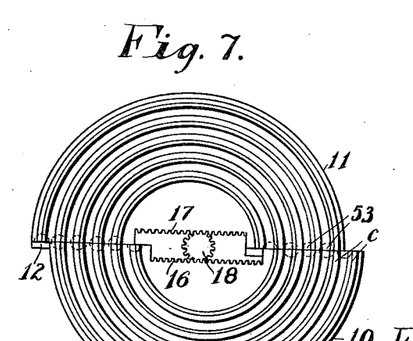
Fig. 7 is a similar view but showing the wheel threads adjusted to transmit reverse motions to the driven element.
Figure 10:
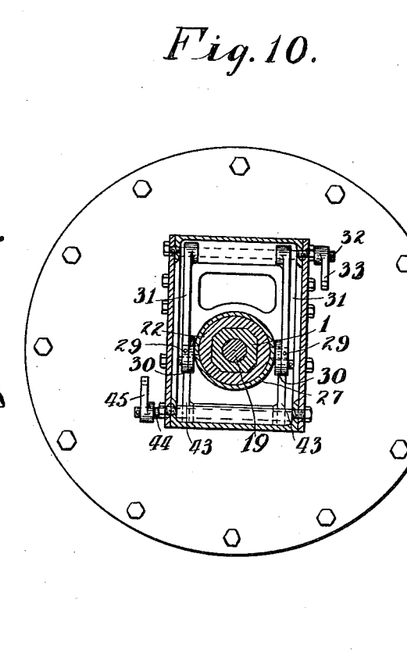
Fig. 10 is a sectional end view taken on the line B—B of Fig. 2 looking in the direction of the arrow.
Figure 11:
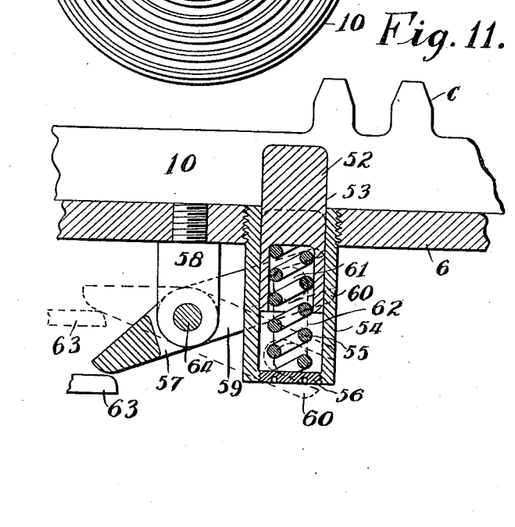
Fig. 11 is a detail of a key or pin mechanism to lock the drive wheel segments in adjusted positions.

The operation of my improved power-transmitting mechanism is substantially as follows: Assuming the parts to be in the Fig. 1 position with the spiral threads or worms c on the driving shaft wheel in mesh with the worm 14 on the driven shaft 15. In this view the worms have been adjusted to form concentric circles as illustrated in Fig. 5, and when so adjusted are in neutral position and no motion is transmitted to the driven shaft. In this connection it might be said that when in neutral position the shaft 15 is locked against either forward or reverse motions even though the drive shaft is continuously rotating. As already stated, in Fig. 1 the driving wheel is shown in operative relation with the driven shaft and in neutral position, no motion being imparted to the driven shaft. Should it now be desired to transmit the second forward speed or rotary motion to the driven shaft, that is with the ratio of the driving shaft with relation to the driven shaft of eight to one, pressure is applied to the foot pedal or lever 48 exerting a forward pull on the rock-arm 46. During the first portion of said pull the arm 46 is caused to rotate about its pivot 65 and lift the pawl 49 out of the notch 50 in the quadrant 51. When the pawl 49 has been released further depression of the lever 48 causes an ear or lug 66 on the rock arm 46 to engage a lug or ear 67 on the rock-shaft arm 45, thereby rocking the shaft 44 and with it the arms 43 connected to the collar 41 on the sleeve of the drive-shaft head 6, sliding said drive-shaft sleeve 6 to the right and throwing the segmental wheel out of operative relation with the driven shaft worm 14. (Fig. 2.) Simultaneously with the throwing of the segmental wheel out of operative relation with the driven shaft 14 the keys 52 are thrown out of engagement with the sockets or recesses 53 in the wheel segments 10, 11 by one arm of the rocking lever 57 engaging with the ring 63, rocking said lever and forcing said keys against the pressure of the springs 55, the keys being held in such position by reason of the engagement of said arm of the lever 57 with the said ring 63. The wheel segments are now in position to be adjusted laterally of each other, which is accomplished by releasing the latch 36 by means of the hand grip 68 and throwing the lever 35 forward from the Fig. 1 to the Fig. 2 position when the latch 36 will drop into the third notch 37 from the left in the rack 38. Simultaneously with this forward throw of the lever 35 movement is imparted to the arm 33 by the rod 34 rocking the shaft 32 and the connected arms 31, thereby sliding the connected bushing 22 to the right (Fig. 1,) and the engagement of the key 21 in said bushing with the helical slot or groove 24 in the shaft 19, causes said shaft and pinion to rotate in the direction indicated by the arrow in Fig. 6, thereby adjusting the segments to the positions illustrated in said figure, and in position to transmit the second forward speed to the driven shaft. Pressure is now released on the foot pedal or lever 48 when the same is caused to assume the dotted line position shown in Fig. 2 by a spring 70. During the first portion of said return movement the auxiliary rock arm 46 has a slight reverse rotary motion upon its pivot 65, causing the release of the lug 66 with the lug 67, until a lug 71 engages with a lug 72 on the arm 45 when the said rocker arm and rock shaft 44 are caused to rock and therewith the arms 43, sliding the drive-shaft head sleeve 6 to the left, and throwing the segmental driving wheel into operative relation with the driven shaft worm 14, and lock it in such position by the pawl 49 engaging with the notch 50 in the quadrant 51, and retained therein by a spring 73 engaging a finger 74 on the auxiliary arm 46 (Figs. 2 and 8). Simultaneously with the throwing of the segmental drive wheel into operative relation with the driven shaft the pressure of the ring 63 on the arm of the lever 57 is released, and either one or both of the locking keys 52 are caused to engage and held in one of the sockets 53 in the wheel segments by the spring 55. (Fig. 11).

I have shown all of the mechanism as inclosed in a dust proof casing, comprising the sections a, b secured together by bolts 75. The end of the section a being closed the screw-threaded cap 5'. For the purpose of ready access to the parts, the section a is provided with a pair of removable side plates 76, 77 secured by means of screws or bolts 78. The casing section a may also be provided with an opening 79 provided with a removable screw threaded cap 80 for the purpose of supplying lubricant to the operating parts.

Variations may be resorted to within the scope of my invention, and portions of the improvements may be used without others.

Having thus described my invention, I claim:—

1. In a power transmission mechanism, a driven element, and a continuously rotating element to transmit variable forward and reverse rotary motions to the driven element, comprising a shaft having a fixed axis and carrying a segmental wheel having a series of semi-circular threads on the face of each wheel segment, said segments adjustable laterally of each other to change the centers of the semi-circular threads relative to the axis of the shaft to transform said threads either into right-hand or left-hand multiple threaded spirals, the driven element comprising a shaft having a worm wheel connected thereto with which the threads on the wheel segments mesh.

2. In a power transmission mechanism, the combination of a driving shaft, a wheel connected thereto having a series of concentric semi-circular threads thereon, so arranged that they can be thrown off center to transform them into spirals, a driven shaft, and a worm wheel connected to the driven shaft and with which the threads on the driving shaft wheel mesh.

3. In a power transmission mechanism, a drive shaft, a power transmission wheel connected to and rotatable with said shaft, comprising a pair of segments adjustable laterally of each other and transversely of the axis of the driving shaft, each segment having a series of semi-circular threads, a driven shaft, and a worm wheel connected thereto with which the threads on the segmental wheel mesh to transmit rotary motion from the drive shaft to the driven shaft.

4. In a power transmission mechanism, a driving shaft, a segmental wheel having a series of concentric circles of threads connected to said shaft to rotate therewith, the segments of the wheel having sliding movement relatively to and laterally of each other and transversely of its axis, a driven shaft, and a worm wheel connected thereto with which the threads on the segmental wheel mesh to transmit rotary motion to the driven shaft.

5. In a power transmission mechanism, a driving shaft, a wheel comprising a pair of semi-circular segments having a series of concentric circles of threads, said wheel segments connected to said shaft to rotate therewith and to have sliding movement laterally of each other and transversely of the axis of the driving shaft, a driven shaft, a worm wheel connected thereto with which the threads on the segmental wheel mesh, and means to throw the segmental wheel into and out of mesh with the driven shaft worm.

6. In a power transmission mechanism, a drive shaft, a wheel comprising a pair of semi-circular segments having a series of concentric threads, said wheel connected to the driving shaft to rotate therewith and to have movement laterally of each other transversely of the axis of the driving shaft, a driven shaft, a worm wheel connected thereto with which the threads on the segmental wheel mesh, and means to adjust the driving-wheel segments laterally of each other to transform the circular threads into multiple threaded spirals to transmit variable forward and reverse rotary motions to the driven shaft.

7. In a power transmission mechanism, a driving shaft having a head connected thereto, a wheel comprising a pair of adjustable segments carried by said head, said segments adjustable laterally of and relatively to each other and having a series of concentric semi-circular threads, said threads when the segments are adjusted relative to each other forming concentric circles, and when adjusted laterally of each other transforming said circles into multiple threaded right or left hand spirals, and a driven shaft, and a worm wheel connected thereto with which the threads on the segmental wheel mesh.

8. In a power transmission mechanism, a driving shaft having a head connected thereto, a wheel comprising a pair of adjustable segments carried by said head, said segments adjustable laterally of and relatively to each other, and having a series of concentric semi-circular threads, said threads when the segments are adjusted relative to each other forming concentric circles, and when adjusted laterally of each other transforming said circles into multiple threaded right or left hand spirals, a driven shaft, a worm wheel connected thereto with which the threads on the segmental wheel mesh; and means to throw the segmental wheel into and out of mesh with the driven-shaft worm.

9. In a power transmission mechanism a drive shaft having a head connected thereto, a wheel comprising a pair of adjustable segments carried by said head, and having a series of concentric semi-circular threads, a driven shaft, a worm wheel connected thereto with which the threads on the segmental wheel mesh; means to throw the segmental wheel into and out of mesh with the driven-shaft worm; and means to adjust the segments of the wheel at will to transform the semi-circular threads into spirals to transmit variable forward and reverse rotary motion to the driven shaft.

10. In a power transmission mechanism, a driving shaft having a head connected thereto, a wheel comprising a pair of segments carried by said head and having a series of concentric semi-circular threads, means to adjust said wheel segments relative to each other to form the threads into concentric circles, and laterally of each other to transform the concentric circles into multiple threaded right or left hand spirals, a driven shaft, and a worm-wheel connected thereto with which the threads on the segmental wheel mesh to transmit variable forward and reverse motions to the driven shaft.

11. In a power transmission mechanism, a driving shaft having a head connected thereto, a wheel comprising a pair of semi-circular segments carried by said head, each segment having a series of semi-circular threads on the face thereof, said segments also having a dovetail connected and provided with rack teeth, a driven shaft, a worm wheel connected thereto with which the threads on the wheel segments mesh, and means for adjusting said wheel segments relatively to each other to form said semi-circular threads into concentric circles of threads, whereby the driving relation between the driving and driven shafts is neutral and no motion transmitted to the driven shaft, and to adjust said wheel segments laterally of each other to transform the semi-circular threads into multiple threaded left or right hand spirals to transmit variable forward and reverse rotary motions to the driven shaft.

12. In a power transmission mechanism, a hollow driving shaft having a head connected thereto; a wheel comprising a pair of semi-circular segments carried by said head, each segment having a series of semi-circular threads on the face thereof, said segments also having a sliding dovetail connection and provided with rack-teeth; a driven shaft; a worm wheel connected thereto with which the threads on the wheel segments mesh; and means for adjusting said wheel segments relatively to and laterally of each other, comprising a shaft mounted in said hollow shaft to rotate therewith and have independent rotary movement having a helical groove therein, a pinion connected to said shaft to mesh with the racks on the wheel segments, a collar mounted on the hollow shaft to rotate therewith and have sliding movement thereon, a key or finger carried by said collar passing through a slot in the hollow shaft to engage with the helical groove in the pinion shaft, and an operating lever connected to the collar to slide it along the hollow shaft to impart rotary motions to the pinion shaft.

13. In a power transmission mechanism, a hollow shaft having a head connected thereto; a wheel comprising a pair of semi-circular segments carried by said head and having a series of semi-circular threads on the face thereof, said segments having a sliding dovetail connection and also having rack teeth; a driven shaft; a worm wheel connected thereto with which the threads on the wheel segments mesh; and means to adjust said wheel segments relatively to and laterally of each other, comprising a shaft having a helical groove therein mounted in said hollow shaft to rotate therewith and have independent rotary movement, a pinion connected to said shaft to mesh with the racks on the wheel segments, a collar mounted on the hollow shaft to rotate therewith and have sliding movement thereon, a key or finger carried by said collar passing through a slot in the hollow shaft to engage with the helical groove in the pinion shaft, an operating lever having a pivotal connection with the collar to slide it along the hollow shaft to impart independent forward and reverse rotary motions to the pinion shaft; and means to throw the segmental wheel into and out of mesh with the worm wheel on the driven shaft.

14. In a power transmission mechanism, a drive shaft having a head connected thereto, a wheel carried by said head comprising a pair of semi-circular segments, each segment having a series of concentric semi-circular threads on the face thereof, said segments also having a dovetail connection and adjustable laterally of each other to transform said semi-circular threads into spirals; means to lock said segments in adjusted position; a driven shaft; and a worm wheel connected thereto with which the threads on the segmental wheel mesh.

15. In a power transmission mechanism, a drive shaft having a head connected thereto, a wheel comprising a pair of semi-circular segments carried by said head having a series of semi-circular threads on the face thereof, and also having a dovetail connection and slidable laterally of each other to transform said semi-circular threads into spirals, means for adjusting said segments; a driven shaft; a worm wheel thereon with which the threads on the segmental wheel mesh; means to throw said segmental wheel into and out of mesh with the driven worm wheel; and means to lock said wheel segments in adjusted positions, comprising a key engaging in a recess in both sections when in locked position, and thrown out of connection with said segments when the segmental wheel is thrown out of mesh with the driven-shaft worm.

16. In a power transmission mechanism, a drive shaft having a head connected thereto, a wheel comprising a pair of semi-circular segments carried by said head having a series of semi-circular threads on the face thereof, and also having a dovetail connection whereby to slide said segments laterally of each other to transform said semi-circular threads into spirals; means for adjusting said segments; a driven shaft; a worm wheel thereon with which the threads on the segmental wheel mesh; means to throw said segmental wheel into and out of mesh with the driven worm-wheel, and means to lock said wheel segments in adjusted position comprising a spring actuated key engaging in both sections when in locked position, and thrown out of connection with said segments when the segmental wheel is thrown out of mesh with the driven shaft worm.

17. In a power transmission mechanism, a drive shaft having a head connected thereto; a sectional casing in one section of which the drive shaft is journaled; a wheel comprising a pair of semi-circular segments carried by said head and having a series of semi-circular threads thereon, said segments having a dovetail connection and adjustable laterally of each other to transform the semi-circular threads into spirals of varying eccentricity; a driven shaft having a worm wheel with which the threads on the segmental wheel mesh, said shaft also being journaled in one of the case sections; means to throw the segmental wheel into and out of mesh with the driven worm-wheel; means for locking the segments of the wheel in adjusted positions, comprising a pair of spring pressed keys engaging in recesses in both segments when in locked position, a pivoted rocking lever connected to each key, a ring in the casing with which an arm of said lever engages when the drive-shaft wheel is thrown out of mesh with the driven shaft to throw said keys out of locking engagement with the wheel segments to permit adjustment of the latter.

18. In a power transmission mechanism, a driven element, and a driving element continuously rotating in one direction to transmit variable forward and reverse rotary motions to the driven element; the driving element comprising a hollow drive shaft, a head connected to said shaft, a wheel consisting of two semi-circular segments mounted on said head and having a series of concentric semi-circular threads, said wheel segments having rack teeth and being adjustable laterally of each other and transversely of its axis to transform said threads into multiple threaded spirals the convolutions of which are in the same plane but of varying eccentricity; means for adjusting said wheel sections, comprising a shaft having a helical groove therein and rotatively mounted in the driving shaft and rotatable therewith, and a pinion thereon to mesh with the rack teeth on the wheel sections, a bushing mounted on the driving shaft to rotate therewith and have sliding movement thereon, a key carried by said bushing passing through a slot in the hollow driving shaft and engaging with the helical groove in the pinion shaft, and a pivoted operating lever, a split collar around the bushing and connected to the lever to adjust the bushing along the driving shaft to impart rotary motion to the pinion shaft; the driven element comprising a shaft, and a worm wheel connected thereto with which the threads on the segmental driving shaft wheel mesh.

19. In a power transmission mechanism, a driven element, and a driving element continuously rotating in one direction to transmit variable forward and reverse rotary motions to the driven element; the driving element comprising a hollow driving shaft, a head connected to said shaft, a wheel consisting of two semi-circular segments mounted on said head and having a series of concentric semi-circular threads, said segments adjustable laterally of each other to transform said threads into multiple threaded spirals; means for adjusting said wheel segments; the driven element comprising a shaft, and a worm wheel connected thereto with which the threads on the segmental driving-shaft wheel mesh; and means to throw the driving element into and out of operative relation with the driven element.

20. In a power transmission mechanism, a driven element, and a driving element continuously rotating in one direction to transmit variable forward and reverse rotary motions to the driven element; the driving element comprising a hollow driving shaft, a head connected to said shaft, a wheel consisting of two semi-circular segments mounted on said head and having a series of concentric semi-circular threads, said segments adjustable laterally of each other to transform said threads into multiple threaded spirals of varying eccentricity; means for adjusting said wheel segments; the driven element comprising a shaft, and a worm wheel connected thereto with which the threads on the segmental driving shaft wheel mesh; and means to throw the driving element into and out of operative relation with the driven element, comprising a thrust bearing and a pair of lock nuts with a collar between the same on the driving shaft, the collar having a pair of oppositely extending lugs, a rock shaft, a pair of arms connected to the rock shaft to engage the lugs on the collar, and an operating lever also connected to the rock shaft.

21. In a power transmission mechanism, a driven element, and a driving element continuously rotating in one direction to transmit variable forward and reverse rotary motions to the driven element; the driving element comprising a hollow drive shaft, a head connected to said shaft, a wheel consisting of two semi-circular segments mounted on said head and having a series of concentric semi-circular threads, said segments adjustable laterally of each other to transform said threads into multiple threaded spirals, and said segments also provided with rack-teeth; means for adjusting said wheel segments comprising a shaft rotatively mounted in the driving shaft and rotatable therewith, and having a helical groove therein, a pinion on said shaft to mesh with the rack-teeth on the wheel segments, a collar mounted on the driving shaft to rotate therewith and have sliding movement thereon, a key carried by said collar passing through a slot in the hollow driving shaft and engaging with the helical groove in the pinion shaft, and a pivoted operating lever connected to the key carrying collar to adjust the latter along the hollow shaft to impart rotary motion to the pinion shaft; the driven element comprising a shaft, and a worm wheel connected thereto with which the threads on the segmental driving shaft wheel mesh; and means to throw the driving element into and out of operative relation with the driven element, comprising a thrust bearing and a pair of lock nuts with a collar between the same on the drive shaft head, a rock shaft, a pair of arms connected to the rock shaft to engage the collar at opposite sides of the driving shaft, and an operating lever also connected to the rock shaft.

22. In a power transmission mechanism, a hollow driving shaft; a head connected to said shaft to rotate therewith and have sliding movement thereon; a wheel connected to said head comprising a pair of semi-circular segments having a series of concentric semi-circular threads, said segments adjustable laterally of each other and transversely of the axis of the driving shaft to transform said threads into multiple threaded right or left hand spirals and also provided with rack-teeth; means for adjusting said wheel segments, comprising a shaft mounted in the hollow shaft to rotate therewith and have independent rotary motion, and having a helical groove therein, a pinion on said shaft to mesh with the rack teeth on the wheel segments, a collar mounted on the driving shaft to rotate therewith and have sliding movement thereon, a key carried by said collar passing through a slot in the hollow driving shaft and engaging with the helical groove in the pinion shaft, a rock-shaft, arms on said rock-shaft connected to the collar, a pivoted operating lever, an arm on the rock-shaft connected with the operating lever, said lever operable to adjust said collar along the driving shaft to impart rotary motions to the pinion shaft; a driven shaft, a worm wheel connected thereto with which the threads on the segmental wheel mesh; and means to throw the drive-shaft wheel into and out of operative relation with the driven-shaft worm, comprising a thrust bearing and a pair of lock nuts on the drive shaft, a collar between said thrust bearing and lock nuts, a rock-shaft mounted in the casing and having a pair of arms connected thereto to engage with the collar at each side of the drive shaft, and an operating lever also connected to said rock-shaft.

23. In a variable speed power transmission mechanism, a hollow drive shaft continuously rotating in one direction; a head having a sleeve to engage the drive shaft to rotate therewith and have sliding movement thereon; a wheel consisting of semi-circular segments and having a series of semi-circular threads thereon, said segments having a dovetail connection and adjustable laterally of each other to transform the semi-circular threads into worms, the said segments being also provided with rack teeth; means for adjusting said wheel segments, comprising a shaft mounted in the driving shaft to have independent rotary motion and rotatable therewith and having a helical groove therein, a pinion on said shaft to mesh with the rack teeth on the wheel segments, a collar mounted on the drive shaft to rotate therewith and have sliding movement thereon, a key carried by said collar passing through a slot in the hollow-drive shaft and engaging with the helical groove in the pinion shaft, and a pivoted operating lever connected to straddle the collar to adjust it along the driving shaft to impart rotary motion to the pinion shaft, a driven shaft, a worm wheel connected thereto with which the threads on the driving-shaft wheel mesh, and means to throw the driving-wheel into and out of mesh with the driven-shaft worm.

24. In a variable speed power transmission mechanism, a hollow drive shaft continuously rotating in one direction; a head having a sleeve to engage the drive shaft to rotate therewith and have sliding movement thereon; a wheel consisting of semi-circular segments and having a series of semi-circular threads thereon, said segments having a dovetail connection and adjustable laterally of each other to transform the semi-circular threads into spirals, the said segments also provided with rack teeth; a lever to adjust said wheel segments; a driven shaft, a worm wheel connected thereto with which the threads on the driving-shaft wheel mesh; and means to throw the driving-shaft wheel into and out of mesh with the driven-shaft worm, comprising a thrust bearing and a pair of lock nuts with a collar between the same on the sleeve of the drive-shaft head, a rock-shaft, a pair of arms connected to the rock-shaft and connected to the collar at opposite sides of the sleeve portion of the drive-shaft head, an actuating lever connected to the rock-shaft, and a releasable latch carried by said actuating lever and engaging with a fixed rack to lock said lever in adjusted positions.

25. In a variable speed power transmission mechanism, a hollow drive shaft continuously rotating in one direction; a head having a sleeve to engage the drive shaft to rotate therewith; a wheel consisting of semi-circular segments and having a series of semi-circular threads thereon, said segments having a dovetail connection and adjustable laterally of each other to transform the semi-circular threads into worms, the said segments also provided with rack teeth; means for adjusting said wheel segments, comprising a shaft mounted in the driving shaft to rotate therewith and have independent rotary motion and having a helical groove therein, a pinion on said shaft to mesh with the rack teeth on the wheel segments, a collar mounted on the drive shaft to rotate therewith and have sliding movement thereon, a key carried by said collar passing through a slot in the hollow drive shaft and engaging with the helical groove in the pinion shaft, and a pivoted operating lever connected to the collar to adjust it along the driving shaft to impart rotary motion to the pinion shaft; a driven shaft; a worm wheel connected thereto with which the threads on the driving-shaft wheel mesh; and means to throw the driving-shaft wheel into and out of mesh with the driven-shaft worm, comprising a thrust bearing and a pair of lock nuts with a collar between the same on the sleeve of the drive-shaft head, a rock-shaft, a pair of arms connected to the rock-shaft and connected to the collar at opposite sides of the sleeve portion of the drive-shaft head, a pivoted actuating lever connected to the rock-shaft, and a releasable latch carried by said actuating lever and engaging with a fixed rack to lock said lever in adjusted positions.

26. In a power transmission mechanism, a driven element and a driving element continuously rotating in one direction to transmit variable forward and reverse rotary movements to the driven element, the driving element comprising a shaft, a segmental wheel connected thereto having a series of concentric semi-circular threads on each segment, each wheel segment being adjustable laterally of the other and transversely to the axis of the shaft, and the driven element comprising a shaft, and a worm-wheel connected thereto with which the threads on the driving shaft mesh.

27. In a power transmission mechanism, a drive shaft; a sectional casing in one section of which the drive shaft is journaled; a head having a sleeve mounted on the drive shaft to rotate therewith and have sliding movement thereon; a segmental wheel mounted on said head and having a series of concentric circles of threads, said segments having a dovetail connection and adjustable laterally of each other to transform the threads into spirals; means for adjusting said segments; means for locking said segments in adjusted position; a driven shaft; a worm wheel thereon with which the threads on the segmental wheel mesh, said shaft being also journaled in one of the case sections; an operating lever to throw the segmental wheel into and out of mesh with the driven-shaft worm; and means to lock the segmental drive wheel in mesh with the driven worm wheel.

28. In a power transmission mechanism, a drive shaft; a sectional casing in one section of which the drive shaft is journaled; a head having a sleeve mounted on the drive shaft to rotate therewith and have sliding movement thereon, a segmental wheel mounted on said head and having a series of concentric circles of threads, said segments having a dovetail connection and adjustable laterally of each other to transform the threads into spirals; means for adjusting said segments; means for locking said segments in adjusted position; a driven shaft; a worm wheel thereon with which the threads on the segmental wheel mesh, said shaft being also journaled in one of the case sections; means to throw the segmental wheel into and out of mesh with the driven-shaft worm, comprising a thrust bearing, and a pair of lock-nuts with a collar having a pair of outwardly-extending pins between the same on the sleeve of the drive-shaft head, a rock-shaft journaled in the casing, a pair of arms connected to said rock shaft and connected with the pins on the collar, and an operating lever also connected to said rock shaft; and means to lock the segmental drive wheel in mesh with the driven wheel.

29. In a power transmission mechanism, a drive shaft; a sectional casing in one section of which the drive shaft is journaled; a head having a sleeve mounted on the drive shaft to rotate therewith and have sliding movement thereon; a segmental wheel mounted on said head and having a series of concentric circles of threads, said segments having a dovetail connection and adjustable laterally of each other to transform the threads into spirals; means for adjusting said segments; means for locking said segments in adjusted positions; a driven shaft; a worm wheel thereon with which the threads on the segmental wheel mesh, said shaft being also journaled in one of the case sections; means to throw the segmental wheel into and out of mesh with the driven-shaft worm, comprising a thrust bearing and a pair of lock-nuts with a collar having a pair of pins between the same on the sleeve of the drive-shaft head, a rock-shaft journaled in the casing, a pair of arms connected to said rock-shaft and connected with the pins on the collar, and an operating lever also connected to said rock shaft; and means to lock the segmental drive wheel in mesh with the driven-wheel worm, comprising an arm connected to the rock shaft, a latch pivotally connected to said arm and to which the operating lever is connected, a quadrant having a notch with which said latch engages, and a spring for retaining said latch in the notch.

30. In a variable speed power transmission mechanism, a driving element comprising a shaft, a segmental wheel thereon having a series of concentric circular threads, said wheel segments adjustable to transform the concentric circular threads into eccentric threads or multiple threaded spirals, the convolutions of which spirals being in the same plane but the eccentricity or throw varying; a driven element comprising a shaft, and a toothed wheel connected thereto with which the threads on the driving wheel mesh; and selective mechanism to throw the driving element into and out of operative relation with the driven element, and to adjust said wheel segments and lock them in adjusted positions.

WILLARD IRVING TWOMBLY.

Witnesses:
PAULA PHILIPP,
JOHN O. SEIFERT.